Feb. 24, 1925.
R. E. RUNDELL
CLUTCH
Filed June 18, 1921
1,527,607
2 Sheets-Sheet 1
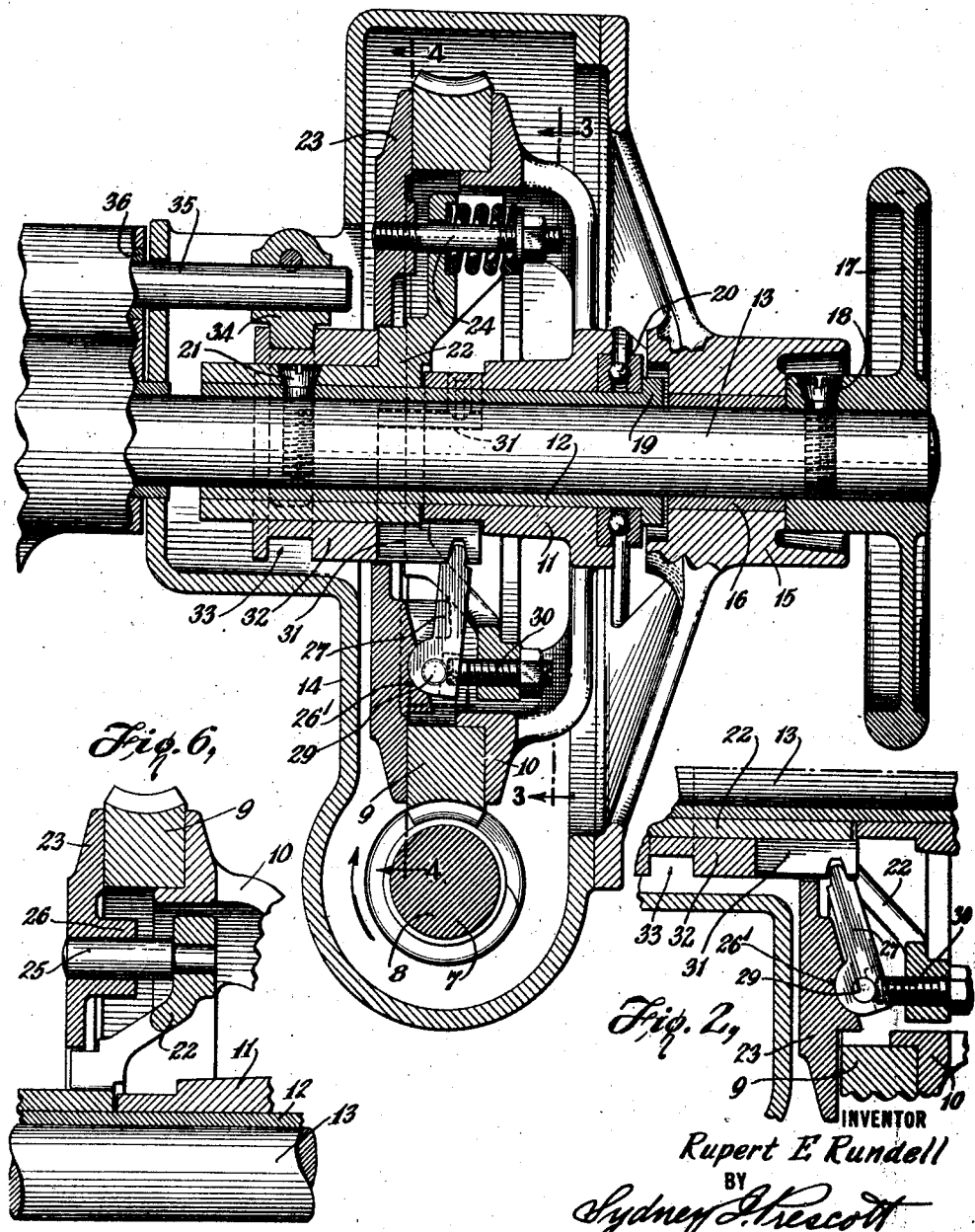
INVENTOR
Rupert E. Rundell
BY
Sydney J. Prescott
ATTORNEY Feb. 24, 1925.

R. E. RUNDELL 1,527,607

CLUTCH

Filed June 18, 1921    2 Sheets-Sheet 2

INVENTOR
Rupert E. Rundell
BY
Sydney Prescott
ATTORNEY

Patented Feb. 24, 1925.

1,527,607

UNITED STATES PATENT OFFICE.

RUPERT E. RUNDELL, OF BROOKLYN, NEW YORK, ASSIGNOR TO INTERNATIONAL CIGAR MACHINERY COMPANY, A CORPORATION OF NEW JERSEY.

CLUTCH.

Application filed June 18, 1921. Serial No. 478,461.

*To all whom it may concern:*

Be it known that I, RUPERT E. RUNDELL, a citizen of the United States, residing at Brooklyn, county of Kings, and State of New York, have invented a new and useful Improvement in Clutches, of which the following is a specification.

This invention relates to an improvement in a clutch for cigar machines. In the operation of fresh work cigar machines, it is sometimes necessary to stop the machine at different points in its cycle of operation to effect adjustments. While such machines have heretofore been equipped with a device for stopping the machine, these devices were not sensitive enough to insure stoppage of the machine at the exact point desired and it has therefore been necessary to turn the machine over by hand when adjustment or a series of adjustments is required. The main object of the present invention is to eliminate this difficulty and provide a device whereby the machine may be stopped at any point however close or distant from the initial point of stoppage it may be. With this and other objects not specifically mentioned in view, the invention consists in certain constructions and combinations which will be hereinafter fully described and then specifically pointed out in the claims hereunto appended.

Figure 3:
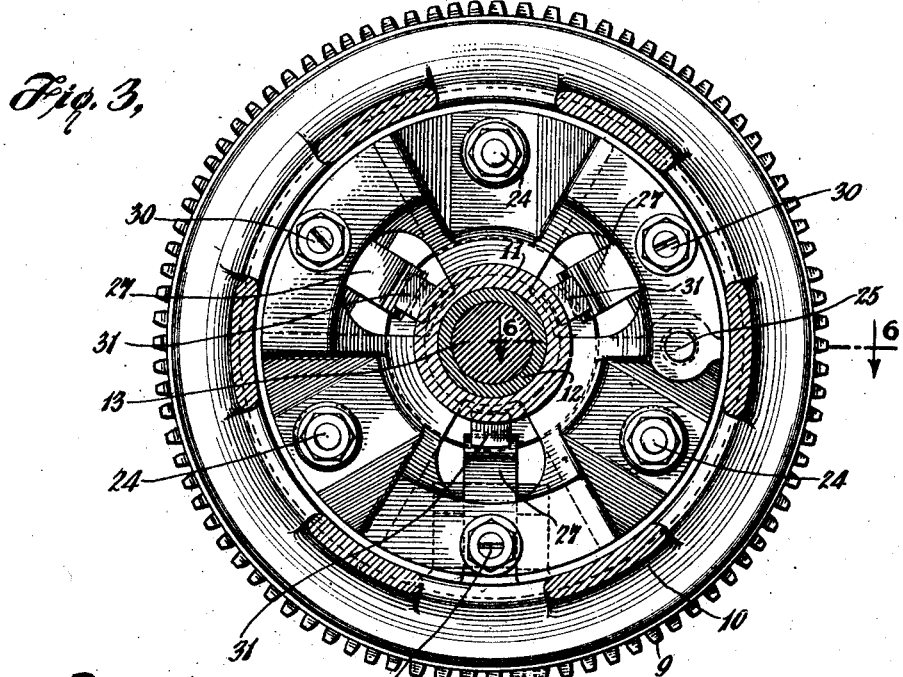
Figure 4:
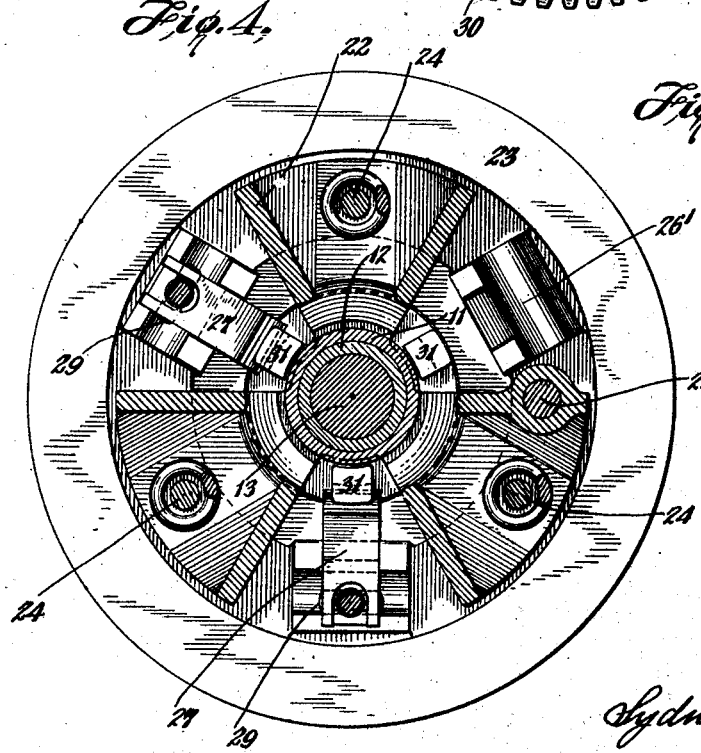
Figure 5:
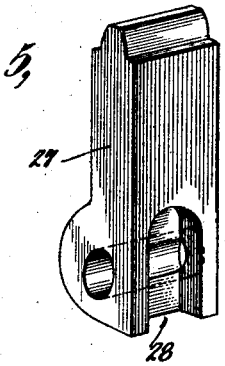

In the accompanying drawings, which form a part of this specification and in which like characters of reference indicate the same or like parts, Fig. 1 is a sectional elevation of a device constructed in accordance with the invention; Fig. 2 is a sectional illustration of a part of the device shown in Fig. 1, with its operating mechanism in a different position; Fig. 3 is a cross-sectional view taken on the line 3—3 in Fig. 1; Fig. 4 is a cross section taken on the line 4—4 in Fig. 1, with one of the cam levers omitted; Fig. 5 is a detail view of one of the cam levers; and Fig. 6 is a fragmentary sectional view taken on the line 6—6 in Fig. 3.

Referring to the drawings, 7 indicates a constantly running power shaft deriving its motion from any suitable source of power. A worm 8 is formed on or carried by the power shaft 7 and this worm is in mesh with and drives a worm wheel comprising a worm ring 9 and a ring supporting spider 10 rigidly connected together. The spider 10 has a hub 11 loosely mounted on a sleeve 12 which surrounds a shaft 13, the shaft 13 being the machine main shaft. The worm 8 and worm wheel 9—10 are enclosed in a casing 14 constructed in two parts bolted or otherwise fastened together, the outer part having a shaft supporting hub 15 and carrying a bush 16. Outside of the bush 16 the shaft is provided with a hand wheel 17 secured to the shaft by means of a screw 18. The sleeve 12 is provided with a flange 19 and interposed between this flange and the outer face of the hub 11 is a thrust ball bearing 20. The inner end of the sleeve 12 is held fast to the shaft 13 by means of a screw 21 which also secures to the inner end of the sleeve a spider 22 always rotatable with the shaft 13.

Contacting with the free face of the worm ring 9 is a friction plate 23 slidably mounted on a shoulder of the spider 22. This friction plate is normally held in contact with the worm ring 9 by means of a series of spring bolts 24, passing through suitable appertures in the spider 22 and of a well known type. The spider 22 further carries a stud 25 slidably engaging a suitable aperture in a boss 26 formed on the friction plate 23 before referred to, the object of this stud being to relieve the spring bolts 24 from driving stresses.

The friction plate 23 is further provided with a series of concave recesses 26′, and in these recesses are located cam levers 27. Each cam lever 27 is provided with a recess 28 and a pin 29, the axis of which is offset slightly from the center of the cam surface of the lever. The spider 22 further carries a series of adjustable screws 30 which contact with the pins 29. The free end of each of the cam levers 27 engages a suitable notch of a prong 31 extending from a shifting sleeve 32 slidably mounted on the cylindrical section of the spider 22. The shifting sleeve 32 is provided with an annular slot 33 and this slot is engaged by a shifting fork 34, held fast on a shifting rod 35 extending through a bearing 36 to a convenient position in which it may be moved by the machine operator at will.

In Fig. 1, the parts are shown in the position they occupy when the machine is running continuously. When it is desired to stop the machine, the shifting rod 35 is moved—as to the left in Fig. 1, and this movement causes the prongs 31 of the shifting sleeve 32 to rock the cam levers 27 and cam the friction plate 23 away from the worm ring 9. An extremely slight disengaging movement of the friction plate 23 is sufficient to stop the machine, and it will be readily understood that re-engagement of the friction plate 23 with the worm ring 9 effects starting of the machine without shock to its delicate parts. And it will be further understood that by means of the mechanism described, the machine may be stopped and started for adjustment and other purposes any number of times during the machine cycle of operation, and its operating periods may be as short as desired without resorting to laborious hand operation.

The particular device selected to illustrate the invention is but one of many possible concrete embodiments of the same; therefore changes and variations may be made in the structure by which the invention is carried into effect without departing from the scope of the claims; and the invention is not to be restricted to the precise details of the particular structure shown and described.

What is claimed is:

1. A clutch comprising a shaft, a worm wheel rotatable on said shaft and having a flat annular face, a worm engaging said wheel, mechanism rotatable with said shaft and provided with a member having a flat annular face, means for causing normal engagement of said faces, and means for disengaging said faces, said mechanism including a spider fast on said shaft and carrying a series of adjusting devices forming a part of said disengaging means.

2. A clutch comprising a shaft, a worm wheel rotatable on said shaft and having a flat annular face, a worm engaging said wheel, mechanism rotatable with said shaft and provided with a member having a flat annular face, means for causing normal engagement of said faces, and means for disengaging said faces, said mechanism including a spider fast on said shaft and carrying a series of adjusting screws forming a part of said disengaging means.

3. A clutch comprising a shaft, a worm wheel rotatable on said shaft and having a flat annular face, a worm engaging said wheel, mechanism rotatable with said shaft and provided with a member having a flat annular face, means for causing normal engagement of said faces, and means for disengaging said faces, said member being provided with a series of pockets for engagement with said disengaging means.

4. A clutch comprising a shaft, a worm wheel rotatable on said shaft and having a flat annular face, a worm engaging said wheel, mechanism rotatable with said shaft and provided with a member having a flat annular face, means for causing normal engagement of said faces, and means for disengaging said faces, said disengaging means including a series of cam levers engaging said member.

5. A clutch comprising a shaft, a worm wheel rotatable on said shaft and having a flat annular face, a worm engaging said wheel, mechanism rotatable with said shaft and provided with a member having a flat annular face, means for causing normal engagement of said faces, and means for disengaging said faces, said member being provided with a series of pockets, and said disengaging means including a series of cam levers supported in said pockets.

6. A clutch comprising a shaft, a worm wheel rotatable on said shaft and having a flat annular face, a worm engaging said wheel, mechanism rotatable with said shaft and provided with a member having a flat annular face, means for causing normal engagement of said faces, and means for disengaging said faces, said disengaging means including a series of cam levers engaging said member, and a device surrounding and movable along said shaft to operate said levers.

In testimony whereof, I have signed my name to this specification.

RUPERT E. RUNDELL.